(12) United States Patent
Gruenewald et al.

(10) Patent No.: US 7,100,799 B2
(45) Date of Patent: Sep. 5, 2006

(54) REMOTE PRESSURE SYSTEM FOR PORTABLE WHIPPED CREAM DISPENSERS

(75) Inventors: Frederick P. Gruenewald, Marblehead, MA (US); Thomas Muldoon, 128 Lafayette St., Marblehead, MA (US) 01945

(73) Assignee: Thomas Muldoon, Marblehead, MA (US)

( * ) Notice: Subject to any disclaimer, the term of this patent is extended or adjusted under 35 U.S.C. 154(b) by 275 days.

(21) Appl. No.: 10/689,322

(22) Filed: Oct. 17, 2003

(65) Prior Publication Data

US 2005/0082312 A1   Apr. 21, 2005

(51) Int. Cl.
  *B67D 5/54*   (2006.01)
  *B65D 83/42*   (2006.01)
(52) U.S. Cl. .............................. 222/1; 222/4; 222/396; 222/399; 222/402.13
(58) Field of Classification Search .................... 222/1, 222/4, 195, 394, 396, 399, 402.13, 402.16
See application file for complete search history.

(56) References Cited

U.S. PATENT DOCUMENTS

| | | | | | |
|---|---|---|---|---|---|
| 3,804,299 | A | * | 4/1974 | Kain | 222/61 |
| 4,940,212 | A | * | 7/1990 | Burton | 261/64.1 |
| 5,570,813 | A | * | 11/1996 | Clark, II | 222/1 |
| 5,730,323 | A | * | 3/1998 | Osborne | 222/55 |
| 6,036,054 | A | * | 3/2000 | Grill | 222/3 |

* cited by examiner

*Primary Examiner*—Joseph A. Kaufman
(74) *Attorney, Agent, or Firm*—Don Halgren

(57) ABSTRACT

A whipped cream dispenser arrangement comprising a portable, hand-held whipped cream dispenser-canister for holding a quantity of cream to be dispensed as whipped cream. The dispenser has a male fitting on the canister with a central bore there-through. The bore encloses a cartridge piercing pin therein, as part of its prior art use. A replacement adapter cap is arranged in fluid communication with a spaced-apart tank of pressurized gas, and the dispenser has a nozzle having a valve therewith for dispensing whipped cream when pressurized gas is introduced through the adapter cap from a large, spaced-apart pressurized gas tank, and into the canister.

7 Claims, 3 Drawing Sheets

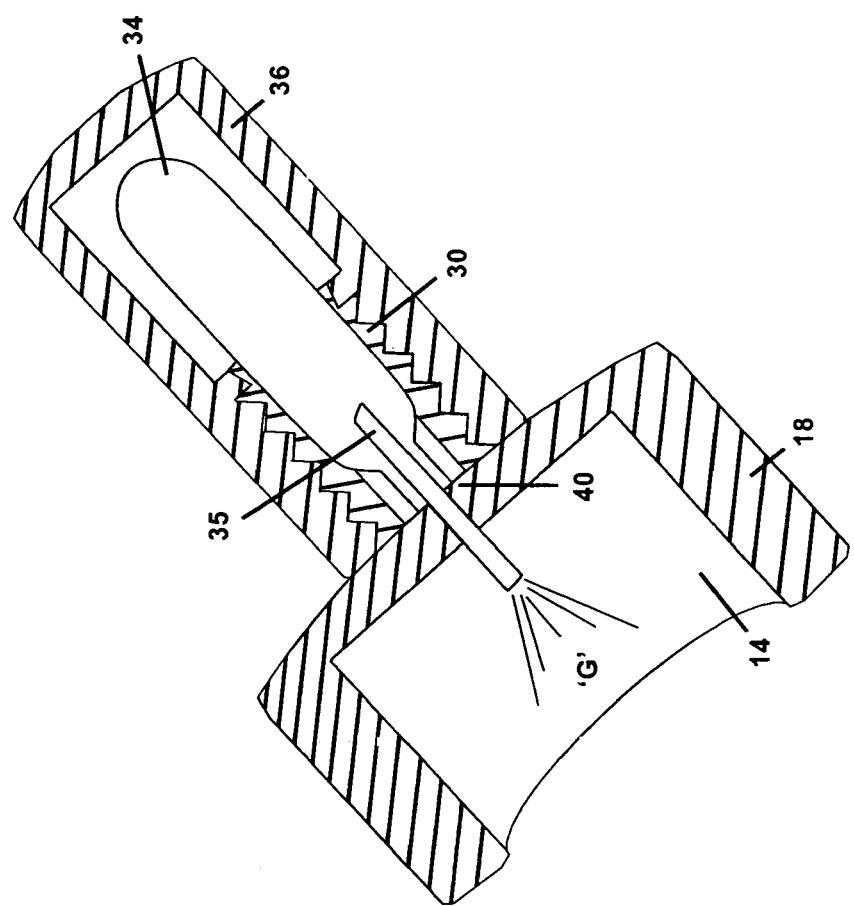

REMOTE PRESSURE SYSTEM FOR PORTABLE WHIPPED CREAM DISPENSERS

BACKGROUND OF THE INVENTION

1. Field of the Invention

This invention relates to whipped cream dispensers and more particularly to large pressurized fluid systems for use with existing portable whipped cream dispensers.

2. Prior Art

Restaurants and coffee shops and the like have used whipped cream dispensers for many years. Such whipped cream dispensers require pressurized fluid (usually gas) to dispense and whip the cream out through a nozzle or dispenser arrangement. Such pressurized whipped cream dispensers of the prior typically have utilized a pressurized carbon dioxide or nitrous oxide cartridge holding about 8 grams of pressurized gas. That cartridge of pressurized gas is typically placed within a small cylindrically shaped holder. A piercable tip of the cartridge is pushed against a piercing pin arranged within a receiving bore on the whipped cream dispenser. The holder is then screwed down about the piercing needle and the gas within the cartridge is allowed to escape into the whipped cream dispenser. These small, individual cartridges are expensive to utilize, costing anywhere from 35 cents to 70 cents per download. Such a cartridge/charger may be useful for about ten to twelve servings per pint of whipped cream. Subsequent discharge of whipped cream requires that the holder be removed from the whipped cream dispenser, and the now empty cartridge be withdrawn from the piercing pin and be replaced with a subsequent cartridge within the holder, and the holder re-screwed onto the whipped cream dispenser. This is a time consuming and expensive procedure to accomplish the simple task of dispensing whipped cream. Such a cartridge (8 gram size), when on the dispenser, hinders the vision of the person applying whipped cream to a food product.

It is an object of the present invention to overcome the disadvantages of the prior art.

It is a further object of the present invention to provide a pressure supply arrangement which may be utilized on existing whipped cream dispensers without the need for replacement of those existing whipped cream dispensers.

It is yet a further object of the present invention to provide a pressurized whipping gas supply system which still permits the portability o the existing whipped cream dispensers yet maintains a long lasting charge of pressurized fluid to dispense that whipped cream from that existing whipped cream dispenser.

It is yet still a further object of the present invention to reduce the cost of pressurizing portable whipped cream dispensers by a large fraction of the cost of the prior art pressurizing cartridges.

It is a still further object of the present invention to provide a pressurized whipping gas system which prevents over-pressurizing of whipped cream dispensers by the elimination of users being able to install multiple cartridges of pressurized gas into a whipped cream dispensing system, thus improving dispensing safety and minimizing the waste of multiple used dispensing cartridges which have to be disposed.

It is a further object of the present invention to improve the visibility of the person using the whipped cream dispenser by eliminating a relatively large view-blocking attachment to the dispenser.

BRIEF SUMMARY OF THE INVENTION

The present invention comprises a remote dispenser-attachable pressurizable system for use with current existing whipped cream dispensers. Such current, existing whipped cream dispensers are comprised of a standard prior art dispenser, canister or chamber for holding the liquid cream therein, a top lid for screwably enclosing the liquid cream within the dispenser canister, a dispenser nozzle extending out through the upper side of the cap, and a handle valve or trigger which when depressed causes the pressurized cream within the canister to press on the cream and thus dispense in an aerated manner the whipped cream through the dispenser nozzle.

Such current whipped cream dispensers also include a male fitting having a central bore for receiving a prior art cartridge. A cartridge piercing pin is arranged within the bore of the male fitting. In the prior art dispensers or canisters, a gas containing cartridge would be placed within a screw cap or holder, and that screw cap or holder would be threadedly attached to the male fitting. The cartridge piercing pin would pierce the cover seal on the cartridge and thus inject pressurized gas within the cream dispenser canister.

Such pressurized gas is only utilizable for a dozen or so servings of whipped cream, and the small 8 gram cartridge of the prior art would then have to be replaced for subsequent servings of whipped cream. In the present invention, the screw on lid or holder is replaced with a miniature adapter cap without any need for a pressurized cartridge therewithin. The miniature adaptor cap has a proximal end which mates with a further valved connector attached to a flexible pressurized fluid supply line. The pressurized fluid supply line has a proximal end which is connected to a pressure regulator, and also is in fluid communication with a large pressurized tank holding about twenty to sixty pounds of pressurized gas. The twenty to sixty pound tank of pressurized gas thus replace many hundreds of small "8 gram" cartridges and the miniature "adaptor cap" replaces the screw down lid or holder of the prior art. One prior art cartridge is used for about every half liter of cream.

In utilization of such a remote pressurization system for portable whipped cream dispensers, the constant changing of individual cartridges is thus eliminated, and the continuous use of an existing dispenser canister from a large pressurized gas tank is thus permitted. The miniature adaptor cap permits the elimination of the multiple individual 8 gram cartridges while permitting the continued use of the whipped cream dispenser canister which heretofore had to utilize only those particular small cartridges.

The invention thus comprises a whipped cream dispenser arrangement comprising a portable, hand-held whipped cream dispenser-canister for holding a quantity of cream to be dispensed as whipped cream; a male fitting on the canister having a central bore therethrough, the bore enclosing a cartridge piercing pin therein; a miniature adapter cap mated onto the male fitting, which is in fluid communication with a spaced-apart tank of pressurized gas; and a nozzle having a valve therewith for dispensing whipped cream when pressurized gas is introduced through the adapter cap and into the canister. A flexible conduit is preferably arranged between the adapter cap and the spaced-apart tank of pressurized gas. The adapter cap may have a snap-on quick release member thereon to permit fast and simple attachment and removal of the flexible conduit.

The invention also includes a method of dispensing whipped cream from a triggered nozzle of an existing whipped cream dispenser having a cartridge of pressurized gas threadedly enclosed within a male fitting and pierced by a piercing pin in the male member on said canister wherein the cartridge has been used to provide gas pressure to the canister, the method comprising the steps of: removing the cartridge from the piercing member in the male fitting on the canister, introducing a volume of cream into the canister of the whipped cream dispenser, threading a miniature adapter cap onto the male member, attaching a flexible fluid supply conduit to the miniature adapter cap, the fluid supply conduit having a stationary pressurized gas supply tank in fluid communication therewith, and squeezing the trigger nozzle to release the cream and pressurized gas from within said canister as whipped cream, to thus permit the existing whipped cream dispenser with a cartridge holder and a cartridge piercing pin to be utilized without a cartridge, yet be in communication with a large stationary supply of whipped cream pressurizing gas. The method may include the step of attaching a connector on the flexible fluid supply conduit to permit the gas supply tank to be readily attached to the adapter cap on the male member. The connector on the flexible fluid supply conduit may have a quick release member thereon to permit quick attachment and removal of the flexible fluid supply conduit from the adapter cap on the male member on the canister.

BRIEF DESCRIPTION OF THE DRAWINGS

The objects and advantages of the present invention will become more apparent when viewed in conjunction with the following drawings in which:

FIG. 3 is a side elevational view in section, showing the prior art using a small pressurized 8 gram cartridge for supplying pressure to such dispenser canisters, which have to be replaced frequently on the dispenser.

DETAILED DESCRIPTION OF THE PREFERRED EMBODIMENTS

Figure 1:
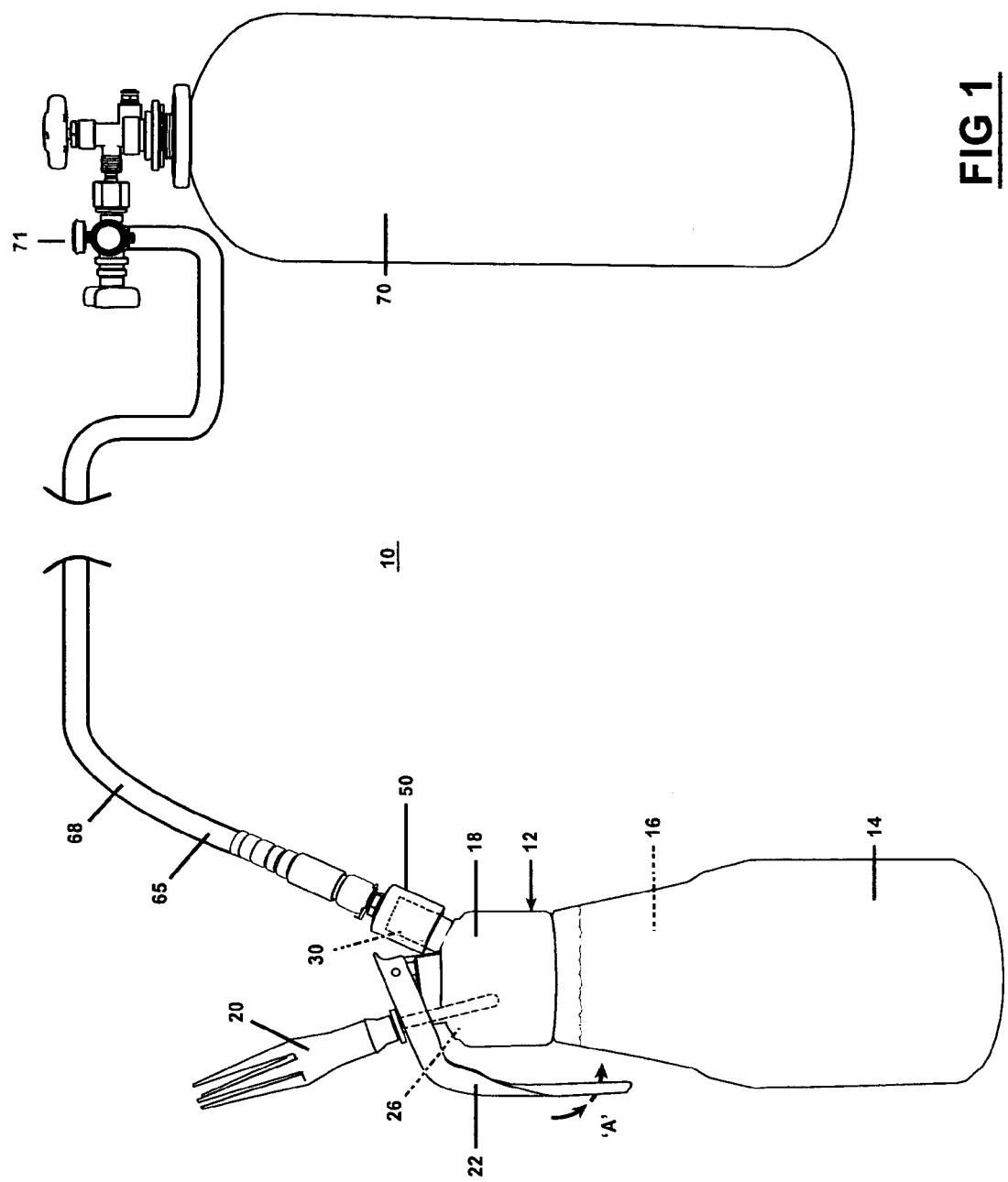
FIG. 1 is a side elevational and plan view of a remote pressurized system for whipped cream dispensers.

Referring now to the drawings in detail, and particularly to FIG. 1, there is shown the present invention which comprises a remote pressurizable system 10 for use with for example, current existing whipped cream dispensers 12 (or carbon dioxide propellants). Such current, existing whipped cream dispensers 12 are comprised of a dispenser, canister or chamber 14 for holding the liquid cream 16 therein, a top cap 18 for screwably enclosing the liquid cream 16 within the dispenser canister 14, a dispenser nozzle 20 extending out through the upper side of the cap 18, and a handle valve and trigger mechanism 22 which when depressed, as indicated by arrows "A" in FIG. 1, causes any cream 16 which has been pressurized within the canister 14 to be dispensed in an aerated manner the whipped cream through the dispenser nozzle 20. In some models of the existing canisters 14, that canister 14 may need to be tipped from a vertical orientation, to an upside down orientation to get the cream 16 adjacent the dispenser nozzle 20 if there is no intake tube 26 within that canister 14.

Figure 2:
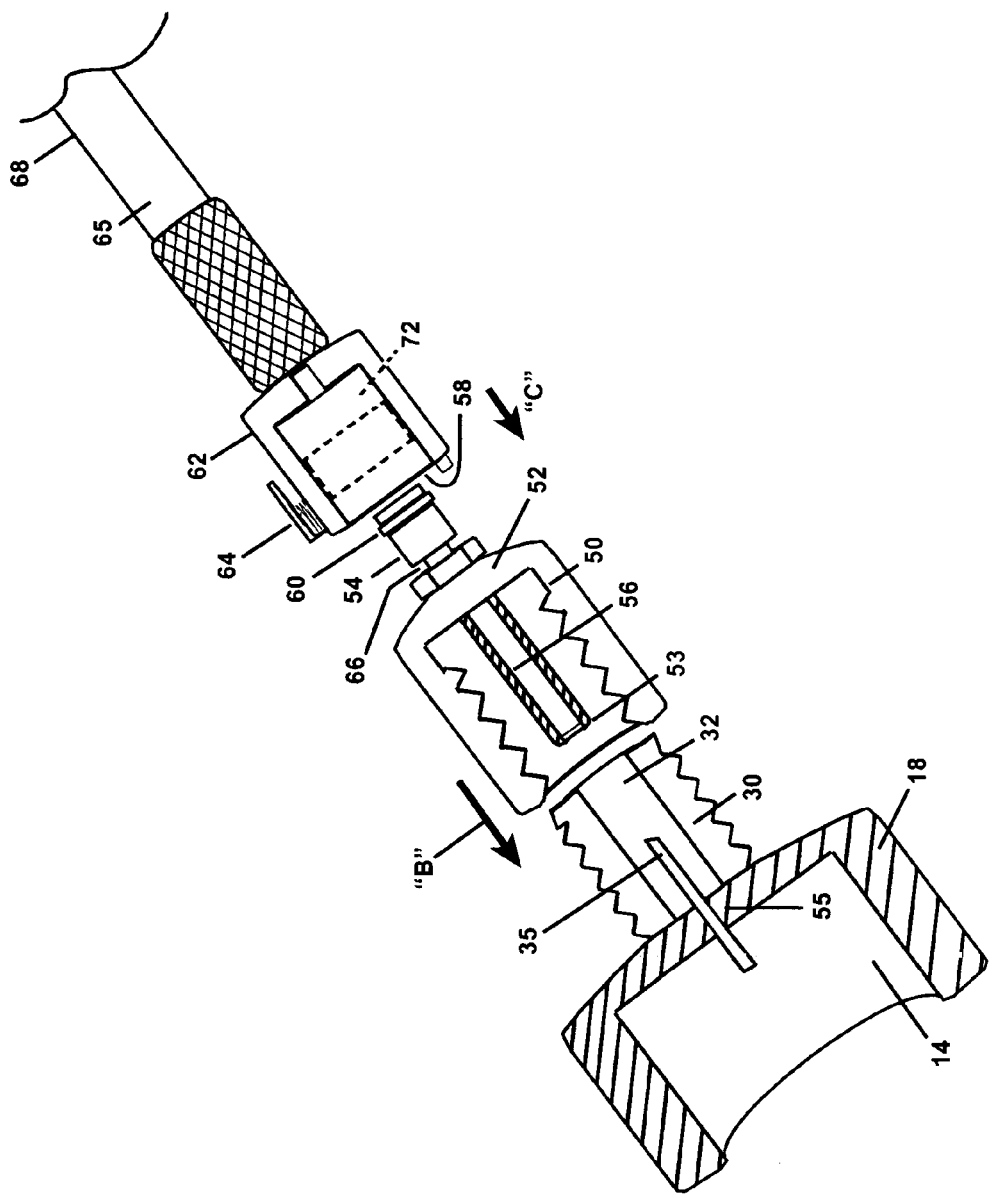
FIG. 2 is an enlarged side elevational view, in section, of the adaptor cap and a male fitting combining the prior art with the present invention.

Such current whipped cream dispensers 12 also include a male fitting 30, shown in FIGS. 1, 2 and 3, having a central bore 32, for receiving a prior art 8 gram cartridge 34, as particularly shown in FIG. 3. The cartridge 34 of the prior art as is specifically depicted in FIG. 3, will no longer be needed, nor will now it be in the way of the person using the new system 10 because such prior art cartridge is replaced by the new system 10, using portions of the early art fittings.

A cartridge piercing pin 35 is arranged within the bore 32 of the male fitting 30, as shown in FIGS. 2 and 3, and may remain there, unused with the invention of the present system 10. In the prior art (existing) dispensers or canisters 12, a gas containing cartridge 34 would be placed within a cylindrically shaped screw cap or holder 36 having an open end 39 and a closed end 42. That screw cap or holder 36, with the cartridge 34 therein, would be threadedly attached to the male fitting 30. The cartridge piercing pin 35 would pierce a cover seal 40 on the cartridge 34 and thus inject pressurized gas "G" within the chamber 14 of the whipped cream dispenser canister 12.

Since such pressurized prior art cartrige gas supply 34 is only utilizable for a dozen or so servings of whipped cream, and the cartridge 34 would then have to be thrown away and replaced by a new cartridge, for subsequent servings of whipped cream from the dispenser 12. In the present invention however, the prior art screw-on lid or cartridge holder 36 shown in FIG. 3 is replaced with a miniature replacement adapter cap 50, shown in FIGS. 1 and 2, thus eliminating any need for a small, volume-limiting pressurized cartridge 34 therewithin. The new small adaptor cap 50 has a proximal end 52 through which a hollow master fitting 54 mates. The master fitting 54 has a distal sleeve 56 which is pushable over the piercing pin 35 of the typical whipped cream dispenser 12, and renders the pin 35 non-functional. The sleeve 56 has a distal end 53 which is pressed against an annular surface 55 around the base of the pin 35, to further seal the fluid communication thereat, when the components (62, 54 and 30) are mated together in aligned, sealed, fluid communication, as shown by the arrows "B" and "C", in FIG. 2. The fitting 54 has a proximal end 58 with an "O" ring 60 thereon. The proximal end 58 of the fitting 54 is arranged to lockably receive a coupler 62. The coupler 62 has a lock switch 64 which lockably engages a shoulder 66 on the fitting 54. The coupler 62 is attached to the distal end 65 of a flexible supply hose 68. The supply hose 68 has a proximal end in fluid communication with a large pressurized gas supply tank 70, as shown in FIG. 1. The gas supply tank 70 holds preferably 20 to 60 pounds of pressurized gas, enough for many individual servings of pressurized cream.

The tank 70 has a pressure regular or control valve 71 which governs the pressure of the gas which may be introduced through the hose 68 and into the dispenser 12.

The coupler 62 also has a spring loaded check valve 72 therewithin, to stop flow of pressurized gas from the supply tank 70 if the coupler 62 is removed from the fitting 54. If the coupler 62 is removed from the fitting 54, pressurized gas will not leak out of the hose 68.

The twenty to sixty pound tank 70 of pressurized gas "G" thus replaces hundreds of small cartridges 34 and the adaptor cap 50 replaces the screw down cap or holder 36 of the prior art. One prior art cartridge 34 is used for example, for every half liter of cream.

In utilization of such a remote pressurization system 10 for portable whipped cream dispensers 12, the constant changing of individual prior art cartridges is eliminated, and the continuous supply of an existing dispenser canister 12 by a large pressurized gas tank 60 is thus permitted. The adaptor cap 50 permits the elimination of the individual 8 gram cartridge 34 while permitting the continued use of the dispenser canister 12 which heretofore had to utilize only those particular small prior art cartridges 34. The dispenser

12 has easier use because of the large adaptor cap arranged around the 8 gram cartridges are no longer utilized.

The invention claimed is:

1. A portable, valved, pressurizable whipped cream dispenser arrangement for continuously dispensing pressurized whipped cream, said arrangement comprising:
   a portable, hand-held pressurized whipped cream dispenser-canister for holding a quantity of cream to be pressurizably dispensed as whipped cream;
   a male fitting on said canister having a central bore therethrough, said male fitting enclosing a cartridge piercing pin;
   a miniature replacement adapter cap arranged on said male fitting and in fluid communication with a spaced-apart tank of pressurized gas via an elongated flexible hose; and
   a pressurized fluid releasing nozzle on said canister, said nozzle having a release valve therewith for dispensing pressurized whipped cream when pressurized gas is introduced through said adapter cap and into said pressurized whipped cream canister.

2. The pressurizable whipped cream dispenser arrangement as recited in claim 1, wherein said replacement adapter cap has a hollow master fitting extending through a proximal end thereof to permit easy attachment of said elongated flexible hose thereto.

3. The pressurizable whipped cream dispenser as recited in claim 2, including a pressure regulating valve to control the pressure of fluid entering said canister.

4. The pressurizable whipped cream dispensed arrangement as recited in claim 2, wherein said hose has a distal end with a snap-on quick release coupler member thereon to permit fast and simple attachment and leak-proof removal of said flexible hose from said master fitting, so as to provide continuous flow of pressurized whipped cream from said pressurized whip cream dispenser when said release valve in said nozzle is opened.

5. A method of continuously dispensing pressurized whipped cream from a triggered nozzle valve of an existing whipped cream dispenser having a cartridge of pressurized gas threadedly enclosed within a male fitting and pierced by a piercing pin in said male member on said canister wherein said cartridge has been used to provide gas pressure to said canister, said method comprising the steps of:
   removing a prior art cartridge holder from said male member on said existing pressurized whipped cream dispenser;
   removing said cartridge from said piercing member in said male fitting on said canister;
   introducing a volume of cream into said canister of said whipped cream dispenser;
   threading a miniature replacement adapter cap onto said male member;
   attaching a master fitting though a proximal end of said replacement adapter cap;
   attaching a flexible fluid supply hose to said master fitting on said replacement adapter cap, said fluid supply hose having a stationary pressurized gas supply tank in fluid communication therewith; and
   squeezing said trigger nozzle valve to pressurizably release a continuous discharge of said now pressurized cream and pressurized gas from within said whipped cream canister to thus permit said existing whipped cream dispenser with a cartridge holder and a cartridge piercing pin to be utilized without a cartridge, yet be in communication with a large stationary supply of whipped cream pressurizing gas.

6. The method as recited in claim 5, including the step of:
   attaching a coupler on a distal end of said flexible fluid supply hose to permit said gas supply tank to be readily attached and removed with respect to said adapter cap on said male member.

7. The method as recited in claim 5, wherein said coupler on said flexible fluid supply hose has a quick release check valve member thereon to permit quick attachment and leak-proof removal of said flexible fluid supply hose from said replacement adapter cap on said male member on said canister.

* * * * *